(12) United States Patent
Xiao et al.

(10) Patent No.: US 12,010,674 B2
(45) Date of Patent: Jun. 11, 2024

(54) BASE STATION, USER EQUIPMENT, AND RELATED METHOD

(71) Applicant: SHARP KABUSHIKI KAISHA, Sakai (JP)

(72) Inventors: Fangying Xiao, Shanghai (CN); Renmao Liu, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/637,117

(22) PCT Filed: Aug. 8, 2018

(86) PCT No.: PCT/CN2018/099385
§ 371 (c)(1),
(2) Date: Feb. 6, 2020

(87) PCT Pub. No.: WO2019/029567
PCT Pub. Date: Feb. 14, 2019

(65) Prior Publication Data
US 2020/0187220 A1  Jun. 11, 2020

(30) Foreign Application Priority Data
Aug. 10, 2017 (CN) .......................... 201710683127.1

(51) Int. Cl.
*H04W 4/00* (2018.01)
*H04W 72/04* (2023.01)
(Continued)

(52) U.S. Cl.
CPC ........... *H04W 72/12* (2013.01); *H04W 72/04* (2013.01); *H04W 72/0453* (2013.01)

(58) Field of Classification Search
CPC ............... H04W 72/042; H04W 76/27; H04W 72/0446; H04W 72/12; H04W 72/04;
(Continued)

(56) References Cited

U.S. PATENT DOCUMENTS 8,462,688 B1  6/2013 Dinan
2016/0021646 A1*  1/2016 Hu .................... H04W 72/23
                                                   370/329
(Continued)

FOREIGN PATENT DOCUMENTS

WO    2016/040290 A1    3/2016

OTHER PUBLICATIONS

3GPP TSG RAN WG2 Meeting NR Ad hoc R2-1707024, Qingdao, China, Jun. 27-29, 2017 (Year: 2017).*
(Continued)

*Primary Examiner* — Atique Ahmed
(74) *Attorney, Agent, or Firm* — ScienBiziP, P.C.

(57) ABSTRACT

The present disclosure provides a method used in a base station, comprising: sending indication information to user equipment (UE), the indication information indicating a correspondence between multiple logical channels or bearers and multiple scheduling request (SR) configurations, wherein each logical channel or bearer is associated with a subcarrier spacing (SCS) and/or transmission time interval (TTI).

4 Claims, 2 Drawing Sheets

300

S310 — Receive indication information from a base station, the indication information indicating a correspondence between multiple logical channels or bearers and multiple SR configurations

(51) Int. Cl.
*H04W 72/0453* (2023.01)
*H04W 72/12* (2023.01)

(58) Field of Classification Search
CPC . H04W 72/0453; H04L 5/0053; H04L 1/1812
See application file for complete search history.

(56) References Cited

U.S. PATENT DOCUMENTS

| | | | |
|---|---|---|---|
| 2016/0029245 A1 | 1/2016 | Hong et al. | |
| 2017/0164419 A1 | 6/2017 | Kim | |
| 2017/0310531 A1* | 10/2017 | Dinan | H04L 27/32 |
| 2017/0311317 A1* | 10/2017 | Dinan | H04W 72/52 |
| 2018/0049227 A1* | 2/2018 | Moon | H04W 72/0446 |
| 2018/0317123 A1* | 11/2018 | Chen | H04W 72/21 |
| 2018/0324867 A1* | 11/2018 | Basu Mallick | H04W 72/569 |
| 2019/0387578 A1* | 12/2019 | Shrestha | H04W 72/21 |

OTHER PUBLICATIONS

NTT Docomo: "New SID Proposal: Study on New Radio Access Technology"; 3GPP TSG RAN Meeting #71; RP-160671; Göteborg, Sweden, Mar. 7-10, 2016.
Intel Corporation, "Handling of multiple SR configurations", R2-1707024, 3GPP TSG RAN WG2 Meeting NR Ad hoc, Qingdao, China, Jun. 27-29, 2017.

* cited by examiner

BASE STATION, USER EQUIPMENT, AND RELATED METHOD

TECHNICAL FIELD

The present disclosure relates to the technical field of wireless communications, and specifically, to a base station, user equipment, and a method related to scheduling requests and logical channels or bearers.

BACKGROUND

A new research project on 5G technical standards (see non-patent literature: RP-160671: New SID Proposal: Study on New Radio Access Technology) was proposed in the 3rd Generation Partnership Project (3GPP) RAN Plenary #71 held in March 2016, and was approved. The purpose of the research project is to develop a New Radio (NR) access technology to meet all of application scenarios, needs, and deployment environments of 5G. NR has three main application scenarios: Enhanced mobile broadband communications (Enhanced mobile broadband: eMBB), massive Machine type communication (mMTC), and Ultra reliable and low latency communications (URLLC).

In order to meet the requirements for low latency in URLLC, "numerology/transmission time interval type" in which logical channels are distinguished in scheduling requests (SRs) was reached in the 3GPP RAN2 #97bis session held in March 2017. The 3GPP RAN2 NR AH #2 session held in June 2017 agreed on the following: if multiple SRs are configured for UE, mapping relationship between logical channels and SRs is configured via RRC signaling, and one logical channel may be mapped to one SR configuration or not mapped to any SR configuration.

The problem involved in the mapping relationship between the logical channels and the SR configurations needs to be solved.

SUMMARY INVENTION

According to a first aspect of the present disclosure, a method used in a base station is provided, comprising: sending indication information to user equipment (UE), the indication information indicating a correspondence between multiple logical channels or bearers and multiple scheduling request (SR) configurations, wherein each logical channel or bearer is associated with a subcarrier spacing (SCS) and/or transmission time interval (TTI).

In an embodiment, the indication information comprises at least one of an information element for each SR configuration and an information element for each logical channel or bearer. The information element for each SR configuration comprises an SR configuration type identifier for the SR configuration, and the information element for each logical channel or bearer comprises an SR configuration type identifier of an SR configuration corresponding to the logical channel or bearer. Alternatively, the information element for each SR configuration comprises a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration, or the information element for each SR configuration comprises a logical channel or bearer list, the logical channel or bearer list comprising an identifier of one or more logical channels or bearers corresponding to the SR configuration, or the information element for each logical channel or bearer comprises an of one or more SR configurations corresponding to the logical channel or bearer, or the information element for each logical channel or bearer comprises a cell identifier of a cell corresponding to the logical channel or bearer. Alternatively, the information element for each SR configuration comprises a bitmap, each bit in the bitmap being associated with a logical channel group identifier, and a value of each bit in the bitmap indicating whether a logical channel belonging to a logical channel group corresponding to the associated logical channel group identifier corresponds to the SR configuration, or the information element for each SR configuration comprises a logical channel group list, the logical channel group list comprising an identifier of one or more logical channel groups corresponding to the SR configuration.

In an embodiment, e indication information is sent via radio resource control (RRC) signaling, the information element for each SR configuration is an information element SchedulingRequestConfig for defining SR-related parameters, the information element for each logical channel is an information element LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

According to a second aspect of the present disclosure, a base station is provided, comprising a transceiver, a processor, and a memory, the processor storing instructions executable by the processor so that the base station performs the method according to the first aspect.

According to a third aspect of the present disclosure, a method used in user equipment (UE) is provided, comprising: receiving indication information from a base station, the indication information indicating a correspondence between multiple logical channels or bearers and multiple scheduling request (SR) configurations, wherein each logical channel or bearer is associated with a subcarrier spacing (SCS) and/or transmission time interval (TTI).

In an embodiment, the indication information comprises at least one of an information element for each SR configuration and an information element for each logical channel or bearer. The information element for each SR configuration comprises an SR configuration type identifier for the SR configuration, and the information element for each logical channel or bearer comprises an SR configuration type identifier of an SR configuration corresponding to the logical channel or bearer. Alternatively, the information element for each SR configuration comprises a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration, or the information element for each SR configuration comprises a logical channel or bearer list, the logical channel or bearer list comprising an identifier of one or more logical channels or bearers corresponding to the SR configuration, or the information element for each logical channel or bearer comprises an indication of one or more SR configurations corresponding to the logical channel or bearer, or the information element for each logical channel or bearer comprises a cell identifier of a cell corresponding to the logical channel or bearer. Alternatively, the information element for each SR configuration comprises a bitmap, each bit in the bitmap being associated with a logical channel group identifier, and a value of each bit in the bitmap indicating whether a logical channel belonging to a logical channel group corresponding to the associated logical channel group identifier corresponds to the SR configuration, or the information element for each SR configuration comprises a logical channel group list, the logical channel group list comprising an identifier of one or more logical channel groups corresponding to the SR configuration.

In an embodiment, the indication information is received via radio resource control (RRC) signaling, the information element for each SR configuration is an information element SchedulingRequestConfig for defining SR-related parameters, the information element for each logical channel is an information element LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

In an embodiment, the method further comprises: when a buffer status report (BSR) associated with one or more logical channels or bearers in the multiple logical channels or bearers is triggered, triggering, according to the correspondence, an SR corresponding to at least one of the one or more logical channels or bearers.

In an embodiment, when a buffer status report (BSR) associated with two or more logical channels or bearers in the multiple logical channels or bearers is triggered, according to the correspondence, an SR corresponding to each of the two or more logical channels or bearers is triggered, or an SR corresponding to a logical channel or bearer having a shortest TTI and/or smallest SCS in the two or more logical channels or bearers is triggered, or an SR corresponding to a logical channel or bearer having a highest priority in the two or more logical channels or bearers is triggered.

According to a fourth aspect of the present disclosure, user equipment (UE) is provided, comprising a transceiver, a processor, and a memory, the processor storing instructions executable by the processor so that the UE performs the method according to the third aspect.

BRIEF DESCRIPTION OF DRAWINGS

The above and other features of the present disclosure will become more apparent with the following detailed description in conjunction with the accompanying drawings, in which.

DETAILED DESCRIPTION OF EMBODIMENTS

Figure 1:
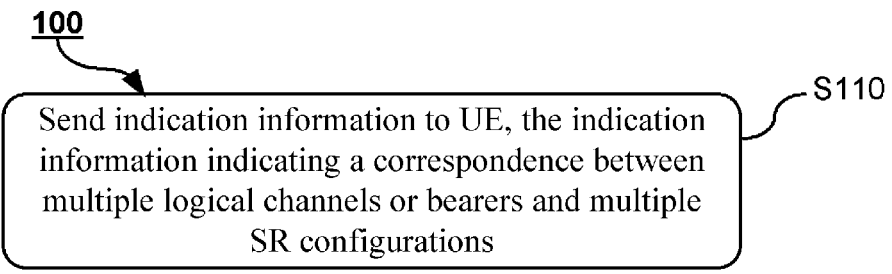
FIG. 1 is a flowchart of a method used in a base station according to an embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms or information elements given in the present disclosure may be named differently in NR, LTE, and eLTE, but unified terms or information elements are used in the present disclosure. When applied to a specific system, the terms or information elements may be replaced with terms or information elements used in the corresponding system, and values of the information elements are those specified in the corresponding system.

PITCH: physical uplink control channel.

Cell: Cell or Carrier, also referred to as a carrier.

RRC: radio resource control.

PDCP: Packet Data Convergence Protocol. In the present disclosure, if not specifically indicated, the PDCP may represent an NR PDCP entity or an LTE or eLTE PDCP entity.

RLC: radio link control. In the present disclosure, if not specifically indicated, the RLC may represent an NR RLC entity or an LIE or eLTE RLC entity.

BSR: buffer status report. The BSR is used for providing to a serving base station information about the amount of data to be transmitted in an uplink buffer corresponding to an associated MAC entity, namely, data to be sent in the PDCP and RLC entities.

logicalChannelGroup information element: logical channel group identifier, which is used for mapping a logical channel to a logical channel group for BSR reporting.

periodicBSR-Timer: timer for BSR reporting. When it is determined in the buffer status reporting process that at least one BSR is triggered and not canceled, the periodicBSR-Timer is started or restarted if in the current TTI, a MAC entity has uplink resources for new transmission and not all generated BSRs are trancated BSRs. A regular BSR is triggered when the timer expires.

retxBSR-Timer: timer for BSR reporting. When it is determined in the buffer status reporting process that at least one BSR is triggered and not canceled, the retxBSR-Timer is started or restarted if in the current TTI, a MAC entity has uplink resources for new transmission. The retxBSR-Timer is restarted when the MAC entity receives an allocation indication for new data transmission for any UL-SCH. A regular BSR is triggered when the timer expires and any logical channel of any logical channel group (LEG) of the MAC entity has transmittable data.

logicalChannelSR-ProhibitTimer: logical channel SR prohibit timer, which is a timer configured for a certain logical channel. The logicalChannelSR-ProhibitTimer is started or restarted when the BSR is triggered by the logical channel provided with the logicalChannelSR-ProhibitTimer having sendable data. When the BSR is not triggered by the logical channel provided with the logicalChannelSR-ProhibitTimer having sendable data and a logicalChannelSR-ProhibitTimer is currently running, the logicalChannelSR-ProhibitTimer is stopped.

logicalChannelSR-Mask information element: for controlling an SR triggering mechanism based on logical channels when uplink allocation is configured.

sr-prohibitTimer: SR prohibit timer, which is a timer for a scheduling request (SR) transmitted on a PUCCH. The timer is started when an SR is sent; an SR cannot be sent when the timer runs.

Numerology: which is referred to as numerology in the present disclosure and corresponds to a subcarrier spacing in the frequency domain. Different numerologies may be defined by scaling a reference subcarrier spacing by an integer n. The reference subcarrier spacing is 15 kHz, and other subcarrier spacings have a relationship with the reference subcarrier spacing satisfying 15 kHz×$2^n$, where n is an integer.

TTI duration: transmission me interval duration, which is denoted as TTI in the present disclosure and corresponds to the number of consecutive symbols in the time domain in one transmission direction. Different TTI durations correspond to different numbers of symbols.

Slot duration: slot duration, which corresponds to different types of TTIs and/or different numerologies and/or different subcarrier spacings (SCSs). Different types of TTIs correspond to different slot durations. The TTI in the present disclosure may also be represented by a slot duration or a transmission time interval duration.

FIG. 1 is a flowchart of a method 100 used in a base station according to an embodiment of the present disclosure.

Step S110: send indication information to user equipment (UE), the indication information indicating a correspondence between multiple logical channels or bearers and multiple scheduling request (SR) configurations. Each logical channel or bearer is associated with a subcarrier spacing (SCS) and/or transmission time interval (TTI). In the context of the present disclosure, because of the correspondence between a logical channel and a bearer, the logical channel and the bearer can be used interchangeably.

LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

Specific implementations of the aforementioned indication information are described below.

Exemplary Implementation 1

The information element for each SR configuration includes an SR configuration type identifier for the SR configuration, and the information element for each logical channel or bearer includes an SR configuration type identifier of an SR configuration corresponding to the logical channel or bearer.

Specifically, the indication information includes an information element SchedulingRequestConfig for defining scheduling request-related parameters. The information element includes an SR configuration type identifier srTypeIndicator for identifying a corresponding SR configuration type. The value of the identifier may be an integer or enumerated value, and each integer or enumerated value corresponds to one type of SR configuration. The information element for defining scheduling request-related parameters may also include an indicator for indicating a numerology and/or TTI or a numerology and/or TTI list that is supported by a PUCCH capable of sending the corresponding SR.

An exemplary description of the SR type indicator srTypeIndicator is given below:

```
- ASN1START
SchedulingRequestConfig ::=            CHOICE {
    release                                NULL,
    setup                                  SEQUENCE {
        sr-TypeIndicator                       ENUMERATED {type 1, type 2....}
        sr-PUCCH-ResourceIndex                 INTEGER (0..2047),
        sr-ConfigIndex                         INTEGER (0..157),
        dsr-TransMax                           ENUMERATED {
                                                   n4, n8, n16, n32, n64, spare3, spare2, spare1}
    }
}
SchedulingRequestConfig-v1020 ::=      SEQUENCE {
    sr-PUCCH-ResourceIndexP1-r10           INTEGER (0..2047)    OPTIONAL    --Need OR
}
SchedulingRequestConfigSCell-r13 ::=       CHOICE {
    release                                NULL,
    setup                                  SEQUENCE {
        sr-TypeIndicator                       ENUMERATED {type 1, type 2....}
        sr-PUCCH-ResourceIndex-r13             INTEGER (0..2047),
        sr-PUCCH-ResourceIndexP1-r13           INTEGER (0..2047)    OPTIONAL,    -- Need OR
        sr-ConfigIndex-r13                     INTEGER (0..157),
        dsr-TransMax-r13                       ENUMERATED {
                                                   n4, n8, n16, n32, n64, spare3, spare2, spare1}
    }
}
```

In an example, the indication information may be sent via radio resource control (RRC) signaling. The RRC signaling may be, for example, an RRC connection reconfiguration message RRCConnectionReconfiguration.

In an example, the indication information may include at least one of an information element for each SR configuration and an information element for each logical channel or bearer. For example, the information element for each SR configuration is an information element SchedulingRequestConfig for defining SR-related parameters, the information element for each logical channel is an information element The indication information may also include an information element LogicalChannelConfig for configuring logical channel parameters. The information element includes an SR association indicator srAssociateIndicator for indicating an SR configuration type associated with a corresponding logical channel (namely, an SR configuration type triggerable when the logical channel has data sendable and an SR triggering condition is satisfied). The value of the indicator can only be a defined SR configuration type.

An exemplary description of the SR association indicator srAssociateIndicator is given below:

```
LogicalChannelConfig ::=            SEQUENCE {
    ul-SpecificParameters               SEQUENCE {
        sr-AssociateIndicator               ENUMERATED {type 1, type 2....}
        priority                            INTEGER (1..16),
        prioritisedBitRate                  ENUMERATED {
                                                kBps0, kBps8, kBps16, kBps32, kBps64,
kBps128,
                                                kBps256, infinity, kBps512-v1020,
kBps1024-v1020,
                                                kBps2048-v1020, spare5, spare4, spare3,
spare2,
                                                spare1},
        bucketSizeDuration                  ENUMERATED {
                                                ms50, ms100, ms150, ms300, ms500, ms1000,
spare2,
                                                spare1},
        logicalChannelGroup                 INTEGER (0..3)          OPTIONAL    --
Need OR
    }       OPTIONAL,                                                           --
Cond UL
    ...,
    [[  logicalChannelSR-Mask-r9        ENUMERATED {setup}  OPTIONAL    --Cond
SRmask
    ]],
    [[  logicalChannelSR-Prohibit-r12   BOOLEAN             OPTIONAL    --Need
ON
    ]]
}
```

Alternatively, the indication information may also include an information element DRB-ToAddMod for configuring data radio bearer (DRB) parameters and/or an information element SRB-ToAddMod for configuring signaling radio bearer (SRB) parameters. The information element includes an SR association indicator srAssociateIndicator. The indicator is used for indicating an SR configuration type associated with a corresponding bearer (the bearer may be a DRB and/or SRB) (namely, an SR configuration type triggerable when a logical channel corresponding to the bearer has data sendable). The value of the indicator can only be a defined SR configuration type.

Exemplary Implementation 2

The information element for each SR configuration includes a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration.

Specifically, the indication information includes an information element SchedulingRequestConfig for defining scheduling request-related parameters. The information element includes a bitmap lch-Bitmap, each bit in the bitmap corresponding to one logical channel identifier (LCH ID), and the logical channel being a logical channel identifier of an SRB and/or DRB and/or split SRB and/or split DRB. The logical channel identifiers in an ascending order can, in turn, correspond to the bits of the bitmap from left to right. For an SRB or DRB supporting repetition or PDCP repetition, if two corresponding logical channels use the same SR configuration or are associated with the same SR configuration, the bitmap can indicate only a logical channel identifier of one of the logical channels, for example, a logical channel identifier of a logical channel having a smaller logical channel identifier or a primary logical channel. A bit having a value "1" in the bitmap indicates that the corresponding logical channel can trigger the corresponding type of SR configuration or the corresponding logical channel is associated with the corresponding type of SR configuration.

An exemplary description of the bitmap is given below:

```
- ASN1START
SchedulingRequestConfig ::=         CHOICE {
    release                             NULL,
    setup                               SEQUENCE {
        lch-Bitmap                          BIT STRING (SIZE (X))
        sr-PUCCH-ResourceIndex              INTEGER (0..2047),
        sr-ConfigIndex                      INTEGER (0..157),
        dsr-TransMax                        ENUMERATED {
                                                n4, n8, n16, n32, n64, spare3, spare2, spare1}
    }
}
SchedulingRequestConfig-v1020 ::=   SEQUENCE {
    sr-PUCCH-ResourceIndexP1-r10        INTEGER (0..2047)       OPTIONAL    --Need
OR
}
SchedulingRequestConfigSCell-r13 ::= CHOICE {
    release                             NULL,
    setup                               SEQUENCE {
        lch-Bitmap                          BIT STRING(SIZE (X))
        sr-PUCCH-ResourceIndex-r13          INTEGER (0..2047),
        sr-PUCCH-ResourceIndexP1-r13        INTEGER (0..2047)   OPTIONAL,    --
```

```
Need OR
    sr-ConfigIndex-r13           INTEGER (0..157),
    dsr-TransMax-r13             ENUMERATED {
                                    n4, n8, n16, n32, n64, spare3, spare2, spare1}
    }
}
```

Alternatively, the RRC message includes an information element SchedulingRequestConfig for defining scheduling request-related parameters. The information element includes a bitmap rb-Bitmap, each bit in the bitmap corresponding to one bearer identifier DRB-Identity or SRB-Identity. The bearer identifiers in an ascending order can, in turn, correspond to the bits of the bitmap from left to right. A bit having a value "1" in the bitmap indicates that the logical channel associated with the corresponding bearer can trigger the corresponding type of SR configuration or the corresponding bearer or the logical channel associated with the bearer is associated with the corresponding type of SR configuration. The bearer identifier is used for identifying a DRB or SRB used by the UE.

Alternatively, the information element for each SR configuration includes a bitmap, each bit in the bitmap being associated with a logical channel group identifier, and a value of each bit in the bitmap indicating whether a logical channel belonging to a logical channel group corresponding to the associated logical channel group identifier corresponds to the SR configuration. Specifically, the indication information includes an information element SchedulingRequestConfig for defining scheduling request-related parameters. The information element includes a bitmap leg-Bitmap, each bit in the bitmap corresponding to one logical channel group identifier LCG ID. The logical channel group identifiers in an ascending order can, in turn, correspond to the bits of the bitmap from left to right. A bit having a value "1" in the bitmap indicates that a logical channel belonging to the corresponding logical channel group can trigger the corresponding type of SR or the logical channel belonging to the corresponding logical channel group is associated with the corresponding type of SR.

Exemplary Implementation 3

The information element for each SR configuration includes a logical channel or bearer list, the logical channel or bearer list including an identifier of one or more logical channels or bearers corresponding to the SR configuration.

Specifically, the indication information includes an information element SchedulingRequestConfig for defining scheduling request-related parameters. The information element includes a logical channel identifier (LCH ID) list, the logical channel being an SRB and/or DRB logical channel. When a certain logical channel identifier included in the list indicates that a logical channel corresponding to the logical channel identifier is associated with the corresponding SR configuration or when the logical channel corresponding to the logical channel identifier has data sendable, the corresponding SR is triggered. It should be noted that "when a logical channel corresponding to the logical channel identifier has data sendable, the corresponding SR is triggered" in the present disclosure means that an SR is trigged only when a condition of triggering the SR is satisfied.

An exemplary description of the logical channel identifier list is given below:

```
- ASN1START
SchedulingRequestConfig ::=         CHOICE {
    release                             NULL,
    setup                               SEQUENCE {
       logicalChannelList ::=              SEQUENCE (SIZE (1..maxSTAG-r11)) OF LCHID
       sr-PUCCH-ResourceIndex                 INTEGER (0..2047),
       sr-ConfigIndex                         INTEGER (0..157),
       dsr-TransMax                           ENUMERATED {
                                                 n4, n8, n16, n32, n64, spare3, spare2, spare1}
    }
}
SchedulingRequestConfig-v1020 ::=   SEQUENCE {
    sr-PUCCH-ResourceIndexP1-r10        INTEGER (0..2047)    OPTIONAL    --Need OR
}
SchedulingRequestConfigSCell-r13 ::=  CHOICE {
    release                             NULL,
    setup                               SEQUENCE {
       logicalChannelList ::=              SEQUENCE (SIZE (1..maxSTAG-r11)) OF LCHID
       sr-PUCCH-ResourceIndex-r13             INTEGER (0..2047),
       sr-PUCCH-ResourceIndexP1-r13           INTEGER (0..2047)    OPTIONAL,   --
Need OR
       sr-ConfigIndex-r13                     INTEGER (0..157),
       dsr-TransMax-r13                       ENUMERATED {
                                                 n4, n8, n16, n32, n64, spare3, spare2, spare1}
    }
}
```

Alternatively, the indication information includes an information element SchedulingRequestConfig for defining scheduling request-related parameters. The information element includes a bearer identifier list, the bearer being an SRB and/or DRB. When a certain bearer identifier included in the list indicates that a logical channel associated with a bearer corresponding to the bearer identifier is associated with the corresponding SR configuration or when the logical channel has data sendable, the corresponding SR is triggered.

Alternatively, the information element for each SR configuration includes a logical channel group list, the logical channel group list including an identifier of one or more logical channel groups corresponding to the SR configuration. Specifically, the indication information includes an information element SchedulingRequestConfig for defining scheduling request-related parameters. The information element includes a logical channel group identifier (LCG ID) list. When a certain logical channel group identifier included in the list indicates that a logical channel belonging to a logical channel group corresponding to the logical channel group identifier is associated with the corresponding SR configuration or when the logical channel belonging to the logical channel group corresponding to the logical channel group identifier has data sendable, the corresponding SR is triggered.

Exemplary Implementation 4

The information element for each logical channel or bearer includes an indication of one or more SR configurations corresponding to the logical channel or bearer.

Specifically, the indication information includes a scheduling request configuration list, each element in the list being an information element SchedulingRequestConfig for defining scheduling request-related parameters.

The indication information further includes an information element LogicalChannelConfig for configuring logical channel parameters. The information element includes an SR configuration indicator srConfigurationIndicator, the indicator being used for indicating an SR configuration associated with a corresponding logical channel (namely, an SR configuration triggerable when the logical channel has data sendable). The elements in the scheduling request configuration list that is configured for the UE are numbered in sequence, and values of the SR configuration indicators are the numbers. For example, the number of the first element in the list is 0 (or 1), the number of the second element is 1 (or 2), and so on.

An exemplary description of the SR association indicator srAssociateIndicator is given below:

```
LogicalChannelConfig ::=         SEQUENCE {
    ul-SpecificParameters            SEQUENCE {
        srConfigurationIndicator         INTEGER (1..X),
        priority                         INTEGER (1..16),
        prioritisedBitRate               ENUMERATED {
                                             kBps0, kBps8, kBps16, kBps32, kBps64,
kBps128,
                                             kBps256, infinity, kBps512-v1020,
kBps1024-v1020,
                                             kBps2048-v1020, spare5, spare4, spare3,
spare2,
                                             spare1},
        bucketSizeDuration               ENUMERATED {
                                             ms50, ms100, ms150, ms300, ms500, ms1000,
spare2,
                                             spare1},
        logicalChannelGroup              INTEGER (0..3)           OPTIONAL       --
Need OR
    }            OPTIONAL,                                                        --
Cond UL
    ...,
    [[  logicalChannelSR-Mask-r9         ENUMERATED {setup}  OPTIONAL  --Cond
SRmask
    ]],
    [[  logicalChannelSR-Prohibit-r12    BOOLEAN             OPTIONAL  --Need
ON
    ]]
}
```

Alternatively, the indication information further includes an information element DRB-ToAddMod and/or SRB-ToAddMod for configuring bearer parameters. The information element includes an SR configuration indicator srConfigurationIndicator, the indicator being used for indicating an SR configuration associated with a corresponding bearer or a logical channel associated with the bearer (namely, an SR type triggerable when the logical channel has data sendable). The elements in the scheduling request configuration list that is configured for the UE are numbered in sequence, and values of the SR configuration indicators are the numbers. For example, the number of the first element in the list is 0 (or 1), the number of the second element is 1 (or 2), and so on.

Exemplary Implementation 5

The information element for each logical channel or bearer includes a cell identifier of a cell corresponding to the logical channel or bearer.

Specifically, the indication information includes an information element LogicalChannelConfig for configuring logical channel parameters. The information element includes a cell indicator cellIndicator, the indicator being used for indicating that a cell associated with a corresponding logical channel or the logical channel can trigger an SR defined on the cell (or an SR transmitted on a physical uplink control channel (PUCCH) of the cell). The value of the cell indicator may be a cell identifier corresponding to a cell provided with a PUCCH and/or SR, including an identifier of a primary cell PCell, for example, 0.

An exemplary description of the cell indicator s given below:

```
LogicalChannelConfig ::=           SEQUENCE {
    ul-SpecificParameters              SEQUENCE {
        cellIndicator                      SCellIndex
        priority                           INTEGER (1..16),
        prioritisedBitRate                 ENUMERATED {
                                              kBps0, kBps8, kBps16, kBps32, kBps64,
kBps128,
                                              kBps256, infinity, kBps512-v1020,
kBps1024-v1020,
                                              kBps2048-v1020, spare5, spare4, spare3,
spare2,
                                              spare1},
        bucketSizeDuration                 ENUMERATED {
                                              ms50, ms100, ms150, ms300, ms500, ms1000,
spare2,
                                              spare1},
        logicalChannelGroup                INTEGER (0..3)          OPTIONAL    --
Need OR
    }       OPTIONAL,                                                          --
Cond UL
    ...,
    [[  logicalChannelSR-Mask-r9       ENUMERATED {setup}  OPTIONAL   --Cond
SRmask
    ]],
    [[  logicalChannelSR-Prohibit-r12  BOOLEAN             OPTIONAL   --Need
ON
    ]]
}
```

Alternatively, the indication information includes an information element DRB-ToAddMod and/or SRB-ToAdd-Mod for configuring bearer parameters. The information element includes a cell indicator cellIndicator, the indicator being used for indicating that a cell associated with a logical channel associated with a corresponding bearer or the logical channel can trigger an SR defined on the cell (or an SR transmitted on a physical uplink control channel (PUCCH) of the cell). The value of the cell indicator may be a cell identifier corresponding to a cell provided with a PUCCH and/or SR, including an identifier of a primary cell PCell, for example, 0.

It should be noted that the bearer in the present disclosure includes a signaling radio bearer (SRB) and a data radio bearer (DRB). The SRB includes, but is not limited to, an SRB, a split SRB, and a master cell group (MCG) split SRB or master cell group (MCG) repeated SRB; the DRB in the present disclosure includes, but is not limited to, a DRB, a repeated. DRB, a split DRB, a master cell group (MCG) split DRB or master cell group (MCG) repeated DRB, a secondary cell group (SCG) split DRB or secondary cell group (SCG) repeated DRB, and a secondary cell group DRB. In dual connection, if the wireless protocol of a bearer is split in a primary base station and belongs to an MCG and an SCG, the bearer is referred to as an MCG split bearer, and the MCG split bearer may be an MCG split DRB or an MCG split SRB. In dual connection, if the wireless protocol of a bearer is split in a secondary base station and belongs to an MCG and an SCG, the bearer is referred to as an SCG split bearer. The SCG split bearer may be an SCG split DRB or an SCG split SRB. The repetition refers to PDCP packet repetition. That is, the same PDCP PDU is sent twice or many times, once in a primary RLC entity, and once in a secondary RLC entity. The PDCP PDU sent twice is not sent on the same carrier.

It should be noted that each logical channel or bearer being associated with a subcarrier spacing (SCS) and/or transmission time interval (TTI) in the embodiment of the present disclosure may also be expressed as data from the logical channel or bearer can be transmitted on a physical uplink shared channel (PUSCH) or uplink scheduling of the associated SCS and/or TTI type.

Figure 2:
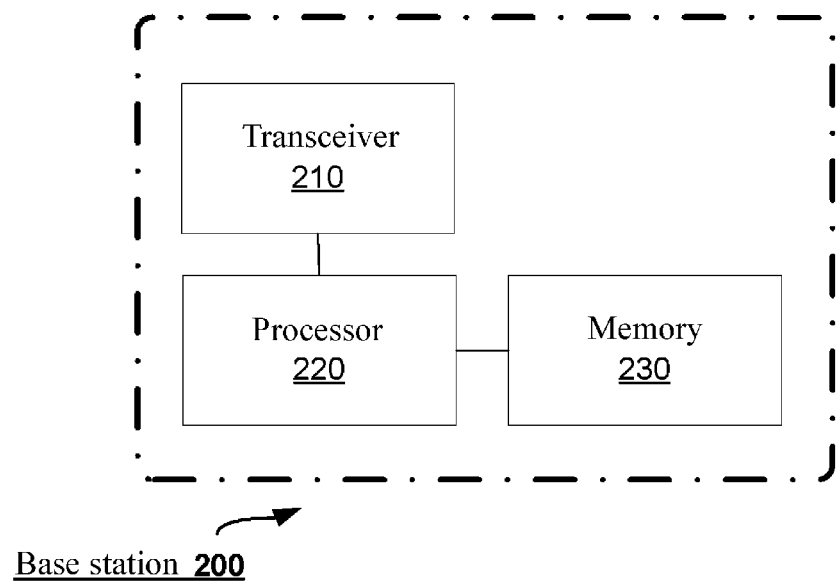
FIG. 2 is a block diagram of a base station according to an embodiment of the present disclosure.

Corresponding to the method 100 described above, the present disclosure provides a base station. FIG. 2 is a block diagram of a base station 200 according to an embodiment of the present disclosure. As shown in the figure, the base station 200 includes a transceiver 210, a processor 220, and a memory 230, the processor 230 storing instructions executable by the processor 220 so that the base station 200 performs the method 100 described above with reference to FIG. 1.

Specifically, the processor 230 stores instructions executable by the processor 220 so that the base station 200 sends indication information to user equipment (UE), the indication information indicating a correspondence between multiple logical channels or bearers and multiple scheduling request (SR) configurations. Each logical channel or bearer is associated with a subcarrier spacing (SCS) and/or transmission time interval (TTI).

In an embodiment, the indication information includes at least one of an information element for each SR configuration and an information element for each logical channel or bearer. The information element for each SR configuration includes an SR configuration type identifier for the SR configuration, and the information element for each logical channel or bearer includes an SR configuration type identifier of an SR configuration corresponding to the logical channel or bearer. Alternatively, the information element for each SR configuration includes a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration, or the information element for each SR configuration includes a logical channel or bearer list, the logical channel or bearer list including an identifier of one or more logical channels or bearers corresponding to the SR configuration, or the information element for each logical channel or bearer includes an indication of one or more SR configurations corresponding to the logical channel or bearer, or the information element for each logical channel or bearer includes a cell identifier of a cell corresponding to the logical channel or bearer. Alternatively, the information element for each SR configuration includes a bitmap, each bit in the bitmap being associated with a logical channel group identifier, and a value of each bit in the bitmap indicating whether a logical channel belonging to a logical channel group corresponding to the associated logical channel group identifier corresponds to the SR configuration, or the information element for each SR configuration includes a logical channel group list, the logical channel group list including an identifier of one or more logical channel groups corresponding to the SR configuration.

In an embodiment, the indication information is sent via radio resource control (RRC) signaling, the information element for each SR configuration is an information element SchedulingRequestConfig for defining SR-related parameters, the information element for each logical channel is an information element LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

Figure 3:
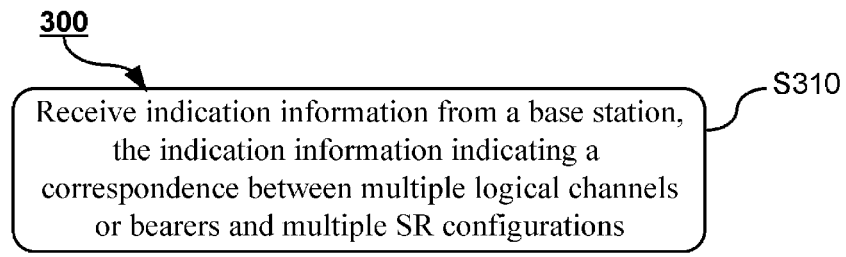
FIG. 3 is a flowchart of a method used in user equipment according to an embodiment of the present disclosure.

The present disclosure further provides a method used in UE. FIG. 3 is a flowchart of a method 300 used in UE according to an embodiment of the present disclosure.

Step S310: receive indication information from a base station, the indication information indicating a correspondence between multiple logical channels or bearers and multiple scheduling request (SR) configurations. Each logical channel or bearer is associated with a subcarrier spacing (SCS) and/or transmission time interval (TTI).

In an example, the indication information may be sent via radio resource control (RRC) signaling. The RRC signaling may be, for example, an RRC connection reconfiguration message RRCConnectionReconfiguration.

In an example, the indication information may include at least one of an information element for each SR configuration and an information element for each logical channel or bearer. For example, the information element for each SR configuration is an information element SchedulingRequestConfig for defining SR-related parameters, the information element for each logical channel is an information element LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

In an example, the information element for each SR configuration includes an SR configuration type identifier for the SR configuration, and the information element for each logical channel or bearer includes an SR configuration type identifier of an SR configuration corresponding to the logical channel or bearer. Alternatively, the information element for each SR configuration includes a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration, or the information element for each SR configuration includes a logical channel or bearer list, the logical channel or bearer list including an identifier of one or more logical channels or bearers corresponding to the SR configuration, or the information element for each logical channel or bearer includes an indication of one or more SR configurations corresponding to the logical channel or bearer, or the information element for each logical channel or bearer includes a cell identifier of a cell corresponding to the logical channel or bearer. Alternatively, the information element for each SR configuration includes a bitmap, each bit in the bitmap being associated with a logical channel group identifier, and a value of each bit in the bitmap indicating whether a logical channel belonging to a logical channel group corresponding to the associated logical channel group identifier corresponds to the SR configuration, or the information element for each SR configuration includes a logical channel group list, the logical channel group list including an identifier of one or more logical channel groups corresponding to the SR configuration.

The specific implementations of the indication information can be seen in Exemplary Implementation 1 to Exemplary Implementation 5 described above with regard to the method 100, and will not be described herein again.

In an example, the method 300 further includes: step S320: when a buffer status report (BSR) associated with one or more logical channels or bearers in the multiple logical channels or bearers is triggered, triggering, according to the correspondence, an SR corresponding to at least one of the one or more logical channels or bearers.

Specifically, if at least one BSR is triggered and not canceled, if an SR triggering condition is satisfied, an SR of a type corresponding to a logical channel or bearer triggering the BSR is triggered.

The SR triggering condition in the present disclosure includes at least one of the following: (1) in the current TTI, a MAC entity does not allocate uplink resources for new transmission; (2) the BSR is a regular BSR; (3) a timer logicalChannelSR-ProhibitTimer is not running; (4) the BSR is not triggered by a logical channel that satisfies a first condition having data sendable, the first condition being that the upper layer establishes a logical channel SR mask for the logical channel; and (5) a mapping relationship between a logical channel triggering the BSR or a logical channel group to which the logical channel belongs and an SR (or SR configuration) is configured (or a scheduling request (SR) is configured for a logical channel triggering the BSR or a logical channel group to which the logical channel belongs).

Optionally, before step S310, the user equipment (UE) reports to the base station the maximum number of SR types supported by the UE in a capability reporting message UECapabilityInformation. Optionally, the method further includes: before the UE sends the capability reporting message, first receiving a system information message from the base station, the system information message including an indicator for indicating whether the base station supports multiple types of SRs or including an indicator for indicating SR types supported by the base station. Optionally, the method further includes: before the UE sends the capability reporting message, first receiving a UE capability query message UECapabilityEnquiry from the base station for requesting radio access capabilities (which may include NR, E-UTTRA, and other RATs) of the UE.

Optionally, the indication information includes a scheduling request configuration list, each element in the list being an information element SchedulingRequestConfig for defining scheduling request-related parameters. The number of the elements in the list does not exceed the maximum number of SRs or maximum number of SR types supported by each cell. For example, SchedulingRequestConfigList::= SEQUENCE (SIZE(1 . . . maxSR)) OF SchedulingRequest-Config and/or SchedulingRequestConfigList::=SE-QUENCE (SIZE(1 . . . maxSR)) OF SchedulingRequest-ConfigScell, where maxSR is the maximum number of SRs or maximum number of SR types that can be defined for each cell, and maxSR may be 2 or 3.

Optionally, the indication information includes a scheduling request configuration list, each element in the list being an information element SchedulingRequestConfig for defining scheduling request-related parameters. A scheduling request configuration list may be defined for each Cell supporting SRs, and the total number of SR configurations defined on all Cells does not exceed a set maximum.

Optionally, the same SR configuration is configured for two logical channels associated with an SRB or DRB supporting repetition.

In an example, in step S320, when a buffer status report (BSR) associated with two or more logical channels or bearers in the multiple logical channels or bearers is triggered, according to the correspondence, an SR corresponding to each of the two or more logical channels or bearers is triggered, or an SR corresponding to a logical channel or bearer having a shortest III and/or smallest SCS in the two or more logical channels or bearers is triggered, or an SR corresponding to a logical channel or bearer having a highest priority in the two or more logical channels or bearers is triggered.

Figure 4:
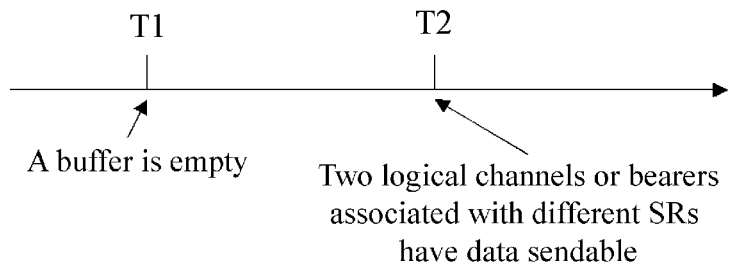
FIG. 4 illustrates a situation in which a buffer status report (BSR) associated with two logical channels or bearers is triggered according to an embodiment of the present disclosure.

FIG. 4 illustrates a situation in which a buffer status report (BSR) associated with two logical channels or bearers is triggered according to an embodiment of the present disclosure. In FIG. 4, at the time T1, a buffer of user equipment is empty. At the time T2, two or more logical channels associated with different SRs or SR configurations or SR types have data sendable.

If at this time, an SR is triggered by multiple logical channels having data to be sent and the multiple logical channels are associated with different SRs or SR configurations or SR types, the SRs or SR types associated with the multiple logical channels can be triggered simultaneously.

Alternatively, if at this time, an SR is triggered by multiple logical channels having data to be sent and the multiple logical channels are associated with different SRs or SR configurations or SR types, an SR or SR type having a shortest TTI and/or smallest numerology (smallest SCS) (or largest TTI and/or largest numerology (largest SCS)) is triggered. The SR or SR type having the shortest TTI and/or smallest numerology (or largest TTI and/or largest numerology) may be a TTI and/or numerology of a corresponding PUCCH resource thereof.

Alternatively, if at this time, an SR is triggered by multiple logical channels having data to be sent and the multiple logical channels are associated with different SRs or SR configurations or SR types, an SR or SR type having a highest priority (or lowest priority) is triggered. If the logical channels have the same priority, one SR or SR type is randomly selected and triggered, or an SR or SR type having a shortest TTI and/or smallest numerology (or largest TTI and/or numerology) is triggered. The SR or SR type having the shortest ITT and/or smallest numerology (or largest TTI and/or numerology) may be a TTI and/or numerology of a corresponding PUCCH resource thereof.

The aforementioned embodiment is not limited to the scenario shown in FIG. 4, and is also applicable to other scenarios in which multiple types of SRs need to be triggered simultaneously.

Figure 5:
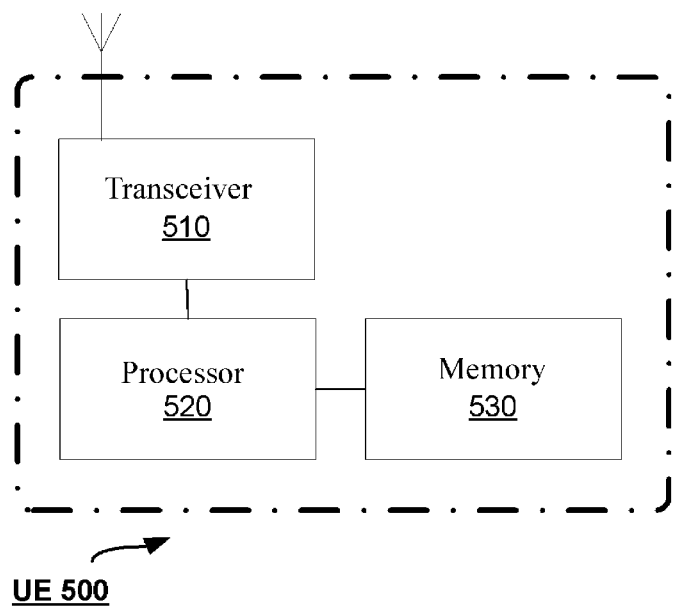
FIG. 5 is a block diagram of user equipment according to an embodiment of the present disclosure.

Corresponding to the method 300 described above, the present disclosure provides user equipment (UE). FIG. 5 is a block diagram of UE 500 according to an embodiment of the present disclosure. As shown in the figure, the UE 500 includes a transceiver 510, a processor 520, and a memory 530, the processor 530 storing instructions executable by the processor 520 so that the base station 500 performs the method 300 described above with reference to FIG. 3.

Specifically, the processor 530 stores instructions executable by the processor 520 so that the UE 500 receives indication information from the base station, the indication information indicating a correspondence between multiple logical channels or bearers and multiple scheduling request (SR) configurations, where each logical channel or bearer is associated with a subcarrier spacing (SCS) and/or transmission time interval (TTI).

In an example, the indication information includes at least one of an information element for each SR configuration and an information element for each logical channel or bearer. The information element for each SR configuration includes an SR configuration type identifier for the SR configuration, and the information element for each logical channel or bearer includes an SR configuration type identifier of an SR configuration corresponding to the logical channel or bearer. Alternatively, the information element for each SR configuration includes a bitmap, each bit in the bitmap being associated with a logical channel identifier or a bearer identifier, and a value of each bit in the bitmap indicating whether a logical channel corresponding to the associated logical channel identifier or a bearer corresponding to the associated bearer identifier corresponds to the SR configuration, or the information element for each SR configuration includes a logical channel or bearer list, the logical channel or bearer list including an identifier of one or more logical channels or bearers corresponding to the SR configuration, or the information element for each logical channel or bearer includes an indication of one or more SR configurations corresponding to the logical channel or bearer, or the information element for each logical channel or bearer includes a cell identifier of a cell corresponding to the logical channel or bearer. Alternatively, the information element for each SR configuration includes a bitmap, each bit in the bitmap being associated with a logical channel group identifier, and a value of each bit in the bitmap indicating whether a logical channel belonging to a logical channel group corresponding to the associated logical channel group identifier corresponds to the SR configuration, or the information element for each SR configuration includes a logical channel group list, the logical channel group list including an identifier of one or more logical channel groups corresponding to the SR configuration.

In an example, the indication information is received via radio resource control (RRC) signaling, the information element for each SR configuration is an information element SchedulingRequestConfig for defining SR-related parameters, the information element for each logical channel is an information element LogicalChannelConfig for configuring logical channel parameters, and the information element for each bearer is an information element DRB-ToAddMod for adding or reconfiguring a data radio bearer (DRB) or an information element SRB-ToAddMod for adding or reconfiguring a signaling radio bearer (SRB).

In an example, the processor 530 further stores instructions executable by the processor 520 so that the UE 500 triggers, according to the correspondence when a buffer status report (BSR) associated with one or more logical channels or bearers in the multiple logical channels or bearers is triggered, an SR corresponding to at least one of the one or more logical channels or bearers.

In an example, when a buffer status report (BSR) associated with two or more logical channels or bearers in the multiple logical channels or bearers is triggered, according to the correspondence, an SR corresponding to each of the two or more logical channels or bearers is triggered, or an SR corresponding to a logical channel or bearer having a shortest TTI and/or smallest SCS in the two or more logical channels or bearers is triggered, or an SR corresponding to a logical channel or bearer having a highest priority in the two or more logical channels or bearers is triggered.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A method performed by a user equipment (UE), the method comprising:
   receiving a Radio Resource Control (RRC) message which contains
   a first parameter for each of one or more scheduling request (SR) configurations, wherein the first parameter is included in a first information element (IE) for each of the SR configurations, and
   a second parameter for each of one or more logical channel configurations, wherein the second parameter is included in a second IE for each of the logical channel configurations,
   wherein the first parameter is an integer, and each of the SR configurations is used to configure parameters for dedicated SR resources,
   each of the logical channel configurations is used to configure logical channel parameters, and
   the second parameter for each of the logical channel configurations has a value that is same as a value of the first parameter for the SR configuration to which a logical channel configured by each of the logical channel configurations is mapped.

2. A method performed by a base station, the method comprising:
   sending a Radio Resource Control (RRC) message which contains
   a first parameter for each of one or more scheduling request (SR) configurations, wherein the first parameter is included in a first information element (IE) for each of the SR configurations, and
   a second parameter for each of one or more logical channel configurations, wherein the second parameter is included in a second IE for each of the logical channel configurations,
   wherein the first parameter is an integer, and each of the SR configurations is used to configure parameters for dedicated SR resources,
   each of the logical channel configurations is used to configure logical channel parameters, and
   the second parameter for each of the logical channel configurations has a value that is same as a value of the first parameter for the SR configuration to which a logical channel configured by each of the logical channel configurations is mapped.

3. A user equipment (UE), comprising:
   a receiving unit configured to receive a Radio Resource Control (RRC) message which contains
   a first parameter for each of one or more scheduling request (SR) configurations, wherein the first parameter is included in a first information element (IE) for each of the SR configurations, and a second parameter for each of one or more logical channel configurations, wherein the second parameter is included in a second IE for each of the logical channel configurations, wherein the first parameter is an integer, and each of the SR configurations is used to configure parameters for dedicated SR resources, each of the logical channel configurations is used to configure logical channel parameters, and the second parameter for each of the logical channel configurations has a value that is same as a value of the first parameter for the SR configuration to which a logical channel configured by each of the logical channel configurations is mapped.

4. A base station, comprising:

a sending unit configured to send a Radio Resource Control (RRC) message which contains a first parameter for each of one or more scheduling request (SR) configurations, wherein the first parameter is included in a first information element (IE) for each of the SR configurations, and a second parameter for each of one or more logical channel configurations, wherein the second parameter is included in a second IE for each of the logical channel configurations, wherein the first parameter is an integer, and each of the SR configurations is used to configure parameters for dedicated SR resources, each of the logical channel configurations is used to configure logical channel parameters, and the second parameter in for each of the logical channel configurations has a value that is same as a value of the first parameter for the SR configuration to which a logical channel configured by each of the logical channel configurations is mapped.

* * * * *